(12) United States Patent
Trawick

(10) Patent No.: US 11,155,339 B2
(45) Date of Patent: Oct. 26, 2021

(54) ELECTRIFIED MECHANICAL CONTROL CABLES

(71) Applicant: Rolls-Royce North American Technologies Inc., Indianapolis, IN (US)

(72) Inventor: David Russell Trawick, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 467 days.

(21) Appl. No.: 16/158,472

(22) Filed: Oct. 12, 2018

(65) Prior Publication Data
US 2020/0115038 A1   Apr. 16, 2020

(51) Int. Cl.
| | | |
|---|---|---|
| *B64C 13/34* | (2006.01) | |
| *B64C 13/30* | (2006.01) | |
| *B64C 13/50* | (2006.01) | |
| *B64C 13/04* | (2006.01) | |

(52) U.S. Cl.
CPC ............ *B64C 13/30* (2013.01); *B64C 13/50* (2013.01); *B64C 13/044* (2018.01); *B64C 13/0423* (2018.01); *B64D 2221/00* (2013.01)

(58) Field of Classification Search
CPC .......... B64C 13/30; B64C 13/26; B64C 13/50
See application file for complete search history.

(56) References Cited

U.S. PATENT DOCUMENTS

| | | | |
|---|---|---|---|
| 8,646,719 B2 | 2/2014 | Morris | |
| 9,187,173 B2 | 11/2015 | Morris | |
| 2009/0317252 A1* | 12/2009 | Garcin | B64C 13/30 |
| | | | 416/114 |
| 2012/0091259 A1* | 4/2012 | Morris | B64C 27/02 |
| | | | 244/17.13 |
| 2014/0246538 A1 | 9/2014 | Morris | |
| 2016/0355194 A1* | 12/2016 | Suppes | B64C 39/022 |

FOREIGN PATENT DOCUMENTS

| | | |
|---|---|---|
| WO | 2010/135727 A1 | 11/2010 |
| WO | 2016/109490 A2 | 7/2016 |

OTHER PUBLICATIONS

Author Unknown, pamphlet entitled: "Choosing the Best Control Cable for Your Application", from Cable Manufacturing & Assembly Co. Inc., Bolivar, Ohio, dated before Oct. 2018, 6 pages.
Author Unknown, "Wire Rope Inspections", internet webpage: http://www.cicb.com/inspections-resources/wire-rope-inspections, Crane Inspection & Certification Bureau, Orlando, Florida, dated before Oct. 2018, 1 page.

(Continued)

*Primary Examiner* — Richard G Davis
(74) *Attorney, Agent, or Firm* — Shumaker & Sieffert, P.A.

(57) ABSTRACT

A first assembly can be configured to exert mechanical control forces on a second assembly through a tensioned and inelastic cable including steel. An electrical power source can be in electric communication with a first portion of the cable. An electrical power consumer can be in electric communication with a second portion of the cable. The cable can be a wire rope.

19 Claims, 3 Drawing Sheets

(56) References Cited

OTHER PUBLICATIONS

Author Unknown, "Stainless Steel Wire Rope 304—6×19 Class—1" (Lineal Foot)", internet catalog webpage: http://www.uscargocontrol.com/Rigging-Supplies-Hardware/Stainless-Steel-Wire-Rope-6x19-IWRC-Type-304/Stainless-Steel-Wire-Rope-304-6x19-Class-1-Lineal-Foot, US Cargo Control, dated before Oct. 2018, 1 page.

Author Unknown, Safety and Health Information Bulletin entitled: "Working Safely with Wire Rope", U.S. Department of Labor, Occupational Safety and Health Administration, Directorate of Technical Support & Emergency Management, Office of Science and Technology Assessment, dated Jan. 19, 2017, 5 pages.

* cited by examiner

ELECTRIFIED MECHANICAL CONTROL CABLES

BACKGROUND

Field of the Disclosure

Among other things, the present disclosure relates to mechanical cables for coupling an input mechanism (e.g., a steering yoke) with an output mechanism (e.g., an aileron). The mechanical cables can be electrified.

Description of Related Art

In a vehicle, an input mechanism can be coupled to an output mechanism with a tensioned mechanical control cable. By virtue of the mechanical control cable (i.e., coupling), a user can adjust a position of the output mechanism (e.g., a steering rack) by manipulating a position of the input mechanism (e.g., a steering wheel).

SUMMARY

A system can include: a first assembly configured to exert mechanical control forces on a second assembly through a tensioned and inelastic cable including steel; an electrical power source in electric communication with a first portion of the cable; and an electrical power consumer in electric communication with a second portion of the cable.

In a system configured to maintain a pair of inelastic cables in perpetual tension between a first assembly with a second assembly, a method can include: conducting electric current from an electric power source to an electric power consumer via one of the tensioned inelastic cables and conducting electric current from the power consumer to the power source via the other of the tensioned inelastic cables.

An aircraft can include: a steering assembly configured to exert mechanical control forces on an exterior control surface through a tensioned and inelastic cable comprising steel extending through one or more pulleys; an electrical power source in electric communication with a first portion of the cable; and an electrical power consumer including a navigation light in electric communication with a second portion of the cable.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, Figures may omit views of certain features.

DETAILED DESCRIPTION

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

At times, the present application uses directional terms (e.g., front, back, top, bottom, left, right, etc.) to give the reader context when viewing the Figures. The claimed inventions, however, are not limited to the orientations shown in the Figures. Any absolute term (e.g., high, low, etc.) can be understood and disclosing a corresponding relative term (e.g., higher, lower, etc.).

Figure 1:
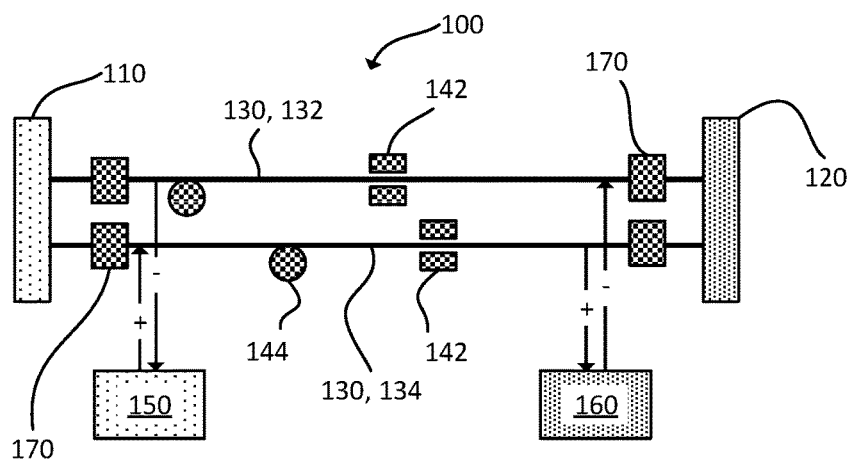
FIGS. 1, 1A, and 1B schematically show various embodiments of a system for transmitting mechanical and electrical energy.

Referring to FIG. 1, system 100 can include a first assembly 110 mechanically coupled with a second assembly 120 via one or more tensioned and inelastic cables 130 (also called ropes). As discussed in further detail below, system 100 can be an aircraft such that first assembly 110 can be a steering input device (e.g., a yoke, pedals, etc.), while second assembly 120 can be a control surface (e.g., a rudder, an elevator, or an aileron). In addition to transmitting mechanical loads, inelastic cables 130 can transmit electricity (e.g., electrical signals) from one region (e.g., the front section of an aircraft) to another region (e.g., the rear of an aircraft)

According to other embodiments, system 100 can be disposed in any suitable device (e.g., a computer, a truck, a boat, a helicopter, etc.) and first and second assemblies 110, 120 can be any kind of components mechanically coupled via inelastic cables 130. In some cases, first and second assemblies 110, 120 can be static components in, for example, a static structure (e.g., a building).

System 100 can be configured to maintain inelastic cables 130 in a perpetual state of tension. Inelastic cables 130 can exist in a tensioned state to transmit mechanical forces applied to one of first and second assemblies 110, 120 to the other of first and second assemblies 110, 120. For example, in the schematic example of FIG. 1, a clockwise rotation of first assembly 110 would induce clockwise rotation of second assembly 120 by reducing tension (at least temporarily) in first inelastic cable 132 and increasing tension (at least temporarily) in second inelastic cable 134.

Figure 3:
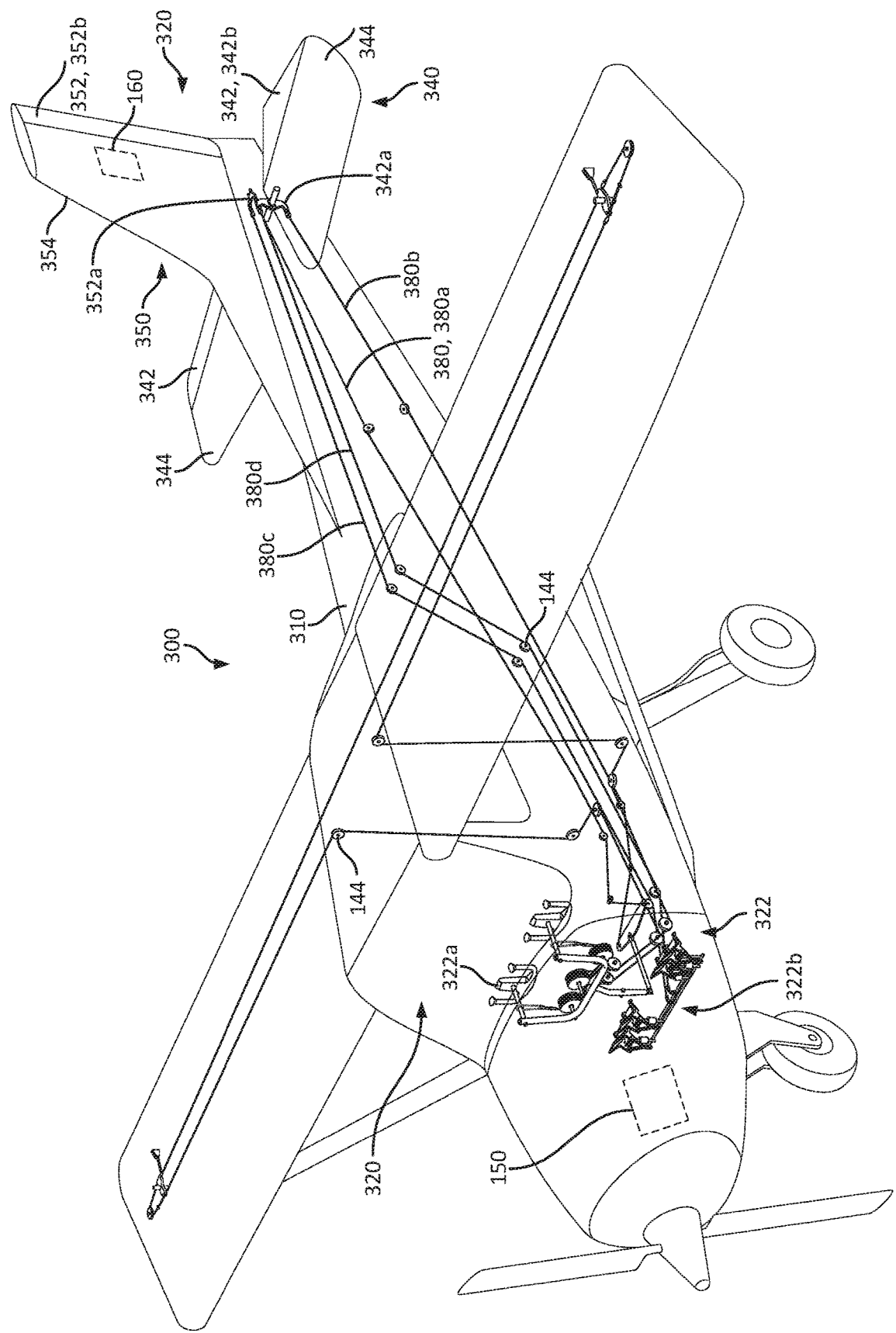
FIG. 3 is a schematic view of an aircraft, which can include one or more of the system embodiments in FIGS. 1, 1A, and 1B.

The linear pathway of inelastic cables 130 shown in FIG. 1 is only an illustrative example. In practice, inelastic cables 130 can have nonlinear geometric pathways defined by turns and twists through brackets 142, pulleys 144, etc, as shown in FIG. 3 (discussed below).

Referring to FIG. 1, inelastic cable 130 can transmit electricity between first electric machine 150 and second electric machine 160. The electricity can be sufficient to power one of the machines. Therefore, one of first electric machine 150 and second electric machine 160 can be, for example, a gas-electric generator, a battery, an alternator, a solar panel, a fuel cell, etc. The other of first electric machine 150 and second electric machine can be any component in need of electricity (e.g., a motor for a control surface (e.g., an electric trim tab), a computer, a sensor, a light, a spark plug, etc.).

The electricity can be digital signals passing between first and second electric machines 150, 160. For example, both of first and second electric machines 150, 160 can be input-output devices of a processing system (e.g., a computing device including one or more processors and memory).

To prevent a short circuit, insulators 170 can be disposed along inelastic cables 130. Any supports between first and second electric machines 150, 160 can similarly be made from an electric insulator at any points of potential direct contact with inelastic cables 130. Insulated supports can include brackets 142 and pulleys 144. As shown in FIG. 1, insulators 170 can be, for example, a polymeric tensile part separating (and thus electrically isolating) consecutive segments of inelastic cable 130.

Figure 1A:
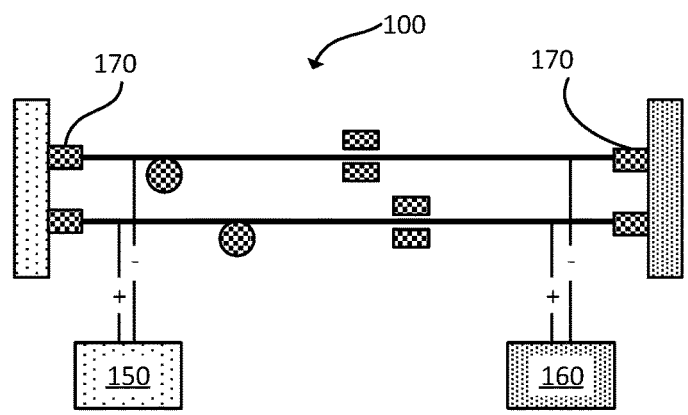
Figure 1B:
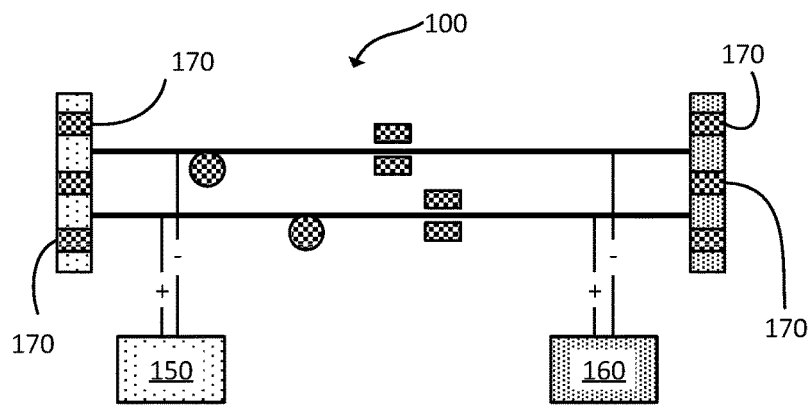

Referring to FIG. 1A, insulators 170 can be directly connected to electric machines 150, 160 to avoid partitioning an inelastic cable 130 into discrete segments as in FIG. 1. Referring to FIG. 1B, first and/or second electric machines 150, 160 can include be at least partially (e.g., fully) formed from insulative material 170 if otherwise made of conductive material.

Figure 2:
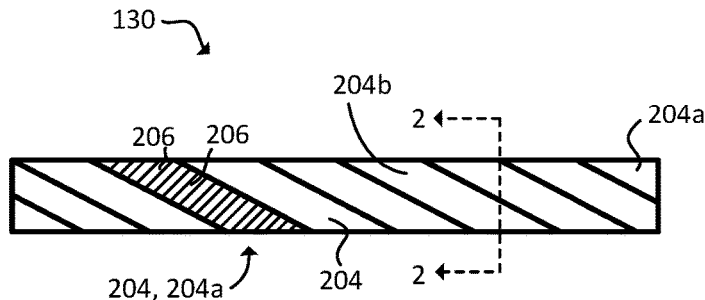
FIG. 2 is a schematic elevational view of a cable.
Figure 2A:
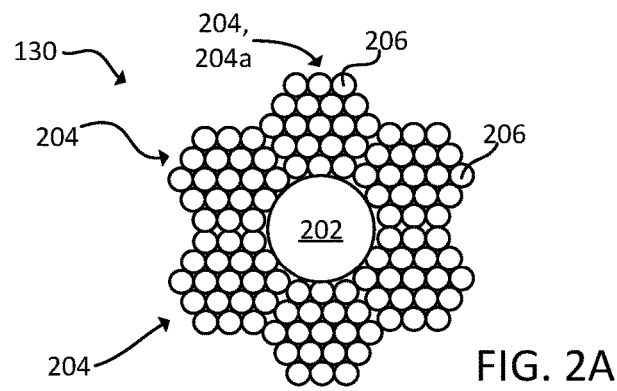
FIGS. 2A-2C are cross sectional views of various cable embodiments viewed from plane 2-2 in FIG. 2.

As shown in FIGS. 2 and 2A, inelastic cables 130 can be a wire ropes. Each inelastic rope 130 can be formed of a plurality of strands 204 helically wound about a central core 202. Each strand 204 can be formed by a plurality of helically wound metal wires 206. In FIG. 2, metal wires 206 are only shown for first strand 204, 204a. According to some embodiments, central core 202 can be absent. Each inelastic cable 130, and each insulator 170 in series with an inelastic cable 130, can have a minimum breaking strength of at least 65, 150, 500, 1500, 3000, 5000, etc. kilograms-force.

Figure 2B:
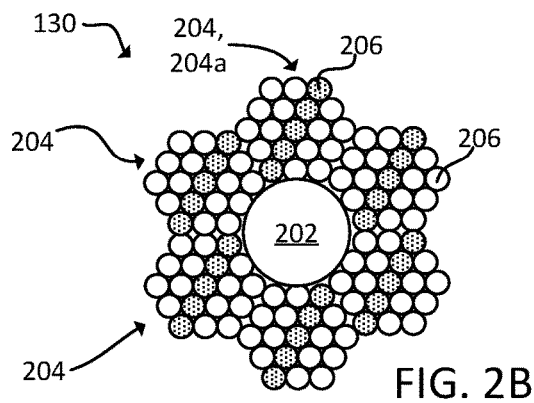

Both of central core 202 and metal wires 206 can be made of galvanized or stainless steel. According to some embodiments, inelastic cables 130 can include a highly conductive metal (e.g., copper, iron, aluminum, alloys thereof, etc.) to facilitate electricity transmission. For example, some of metal wires 206 can be made of steel while other metal wires 206 can be made of highly conductive metal. In FIG. 2B, the stippled metal wires 206 are made of a highly conductive metal while the un-stippled metal wires 206 are made from steel. Alternatively, or in addition, central core 202 can be made of highly conductive metal.

Figure 2C:
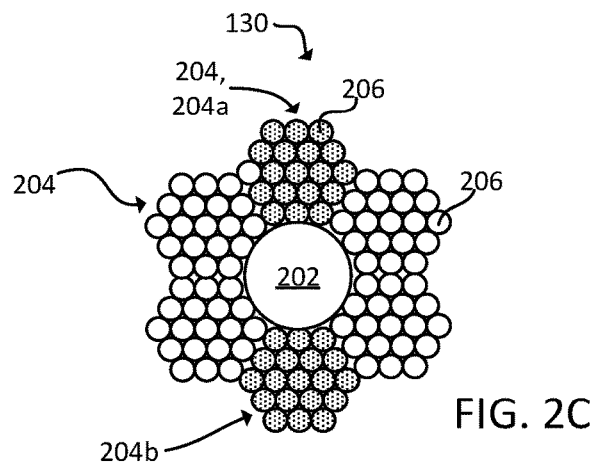

As shown in FIG. 2C, central core 202 can be made of an insulator (e.g., a non-conductive polymer) while diametrically opposing strands 204a, 204b can be made from highly conductive metal wires 206. Although not shown, at least (e.g., only) strands 204a, 204b can be covered with an insulative sheath. In the embodiment of FIG. 2C, inelastic cable 130 can carry current in two directions (e.g., in a first direction with strand 204a and in an opposing direction with strand 204b) such that dual inelastic cables 130 are unnecessary to form a complete circuit.

Inelastic cables 230 are not limited to the designs shown in FIGS. 2-2C. According to some embodiments, inelastic cables 230 can be traditional data cables (e.g., Ethernet cables, coaxial cable) disposed inside an inelastic casing (i.e., sheath).

Referring to FIG. 3, aircraft 300 can include a body 310 to which a tail assembly 330 is mounted. A wing assembly (not labeled) can include ailerons (not labeled) rotatably attached to wings (not labeled). Tail assembly 330 can include a transverse assembly (also called a tailplane) 340 and a vertical assembly (also called a fin) 350.

Transverse assembly 340 can include an elevator 342 rotatably attached to a horizontal stabilizer 344. Elevator 342 can include a rotatable elevator plate 342a connected to a pair of opposing inelastic cables 380a, 380b. The exterior elevator control surface 342b of elevator 342 can be rotatably coupled with elevator plate 342a.

Vertical assembly 350 can include a rudder 352 rotatably attached to a vertical stabilizer 354. Rudder 352 can include a rotatable rudder plate 352a connected to a pair of opposing inelastic cables 380c, 380d. The exterior rudder control surface 352b of rudder 352 can be rotatably coupled with rudder plate 352a.

Body 310 can include a cockpit (i.e., front section) 320 with a steering input assembly 322. Steering input assembly 322 can include one or more yokes 322a (e.g., wheels and/or sticks) and pedals 322b for tensioning inelastic cables 380 to control the trims of elevator 342, rudder 352, and wing ailerons (not labeled).

For example, when yoke 322a is pulled backward (toward the pilot), inelastic cables 380a, 380b can respectively release and tension to rotate elevator plate 342a, and thereby elevator control surface 342b, clockwise. The opposite can occur when yoke 322b is pushed forward (away from the pilot). When a left-sided pedal 322b is engaged, inelastic cables 380c, 380d can respectively tension and release to rotate rudder plate 352a, and thereby rudder control surface 352b, counterclockwise. The opposite can occur when a right-sided pedal 322b is engaged.

Referring to FIGS. 1 and 3, first assembly 110 can be steering input 322 (e.g., yoke 322a or pedals 322b), first inelastic cable 132 can be upper elevator inelastic cable 380a, second inelastic cable 134 can be lower elevator inelastic cable 380b, and second assembly 120 can be elevator 342. As another example, first assembly 110 can be steering input 322 (e.g., yoke 322a or pedals 322b), first inelastic cable 132 can be right rudder inelastic cable 380c, second inelastic cable 134 can be left rudder inelastic cable 380d, and second assembly 120 can be rudder 352.

Inelastic cables 380 can be electrified in the manner discussed with reference to FIGS. 1-2C to carry electricity from a first electric machine 150 to a second electric machine 160. According to some embodiments, first electric machine 150 is an electric generator (e.g., alternator) connected to an engine and second electric machine 160 is a reserve battery, an electric trim motor for elevator 342 or rudder 352, and/or navigation (e.g., tail) lights.

I claim:

1. A system comprising:
a first assembly configured to exert mechanical control forces on a second assembly through a first tensioned and inelastic cable comprising steel and a second tensioned and inelastic cable comprising steel;
an electrical power source in electric communication with a first portion of the first cable and a first portion of the second cable; and
an electrical power consumer in electric communication with a second portion of the first cable and a second portion of the second cable.

2. The system of claim 1, wherein the cable comprises strands of metal wire twisted into a helix, each strand of metal wire comprising both steel and copper wires.

3. The system of claim 1, wherein the power source, the power consumer, the first cable, and the second cable define, at least partially, an electric circuit.

4. The system of claim 3, wherein the power consumer comprises a tail light.

5. The system of claim 1, wherein the first assembly, the second assembly, and the cable are aspects of a steering assembly enabling a user to control a position of the second assembly by actuating the first assembly.

6. The system of claim 1, wherein the first assembly comprises a steering mechanism disposed in an aircraft cockpit and the second assembly comprises an external control surface of the aircraft.

7. The system of claim 6, wherein the external control surface comprises a flap configured to yaw, pitch, and/or roll the aircraft.

8. The system of claim 7, wherein the flap is an elevator moveably attached to a horizontal stabilizer of the aircraft.

9. The system of claim 1, wherein one of the first and second assemblies comprises the power source and the other of the first and second assemblies comprises the power consumer.

10. In a system configured to maintain a pair of inelastic cables in perpetual tension between a first assembly with a second assembly, a method comprising:
   conducting electric current from an electric power source to an electric power consumer via one of the tensioned inelastic cables and conducting electric current from the power consumer to the power source via the other of the tensioned inelastic cables.

11. The method of claim 10, wherein the first assembly comprises a steering yoke and the second assembly comprises an aircraft control surface.

12. The method of claim 10, wherein each of the inelastic cables are wire ropes, each wire rope comprising a plurality helically wound metallic strands, each metallic strand comprising a plurality of helically wound metallic wires.

13. The method of claim 12, wherein the inelastic cables are each wound through one or more pulleys, each of the one or more pulleys being formed from insulator at any points of potential contact with the inelastic cables.

14. The method of claim 10, wherein the electric power source and the electric power consumer are located at opposing ends of the system.

15. The method of claim 14, wherein the electric power consumer comprises a navigation light.

16. An aircraft comprising:
   a steering assembly configured to exert mechanical control forces on an exterior control surface through a tensioned and inelastic cable comprising steel extending through one or more pulleys;
   an electrical power source in electric communication with a first portion of the cable; and
   an electrical power consumer comprising a navigation light in electric communication with a second portion of the cable.

17. The aircraft of claim 16, wherein the inelastic cable is a wire rope comprising a plurality helically wound metallic strands, each metallic strand comprising a plurality of helically wound metallic wires.

18. The aircraft of claim 16 comprising a second tensioned and inelastic cable comprising steel extending through one or more pulleys, the steering assembly configured to exert mechanical forces on the exterior control surface through both the first and second cables;
   the electrical power source, the first cable, the electric power consumer, and the second cable defining, at least partially, an electric circuit.

19. The aircraft of claim 18, wherein the steering assembly comprises a yoke and the exterior control surface comprises an elevator.

* * * * *

UNITED STATES PATENT AND TRADEMARK OFFICE
CERTIFICATE OF CORRECTION

| | |
|---|---|
| PATENT NO. | : 11,155,339 B2 |
| APPLICATION NO. | : 16/158472 |
| DATED | : October 26, 2021 |
| INVENTOR(S) | : David Russell Trawick |

It is certified that error appears in the above-identified patent and that said Letters Patent is hereby corrected as shown below:

In the Claims

In Column 6, Claim 17, Line number 13, replace "plurality helically wound" with --plurality of helically wound--

Signed and Sealed this
Thirty-first Day of May, 2022

Katherine Kelly Vidal
*Director of the United States Patent and Trademark Office*